(12) United States Patent
Gadre et al.

(10) Patent No.: US 8,187,361 B2
(45) Date of Patent: May 29, 2012

(54) EFFLUENT GAS RECOVERY SYSTEM IN POLYSILICON AND SILANE PLANTS

(75) Inventors: Sarang Gadre, Bear, DE (US); Madhava R. Kosuri, Newark, DE (US)

(73) Assignee: America Air Liquide, Inc., Fremont, CA (US)

( * ) Notice: Subject to any disclaimer, the term of this patent is extended or adjusted under 35 U.S.C. 154(b) by 411 days.

(21) Appl. No.: 12/497,533

(22) Filed: Jul. 2, 2009

(65) Prior Publication Data

US 2011/0000257 A1  Jan. 6, 2011

(51) Int. Cl.
  *B01D 53/22* (2006.01)
  *B01D 53/02* (2006.01)
  *B01D 50/00* (2006.01)
  *C01B 33/02* (2006.01)
  *C01B 33/107* (2006.01)

(52) U.S. Cl. ............ 95/55; 95/45; 95/116; 95/132; 96/4; 96/108; 96/134; 423/342; 423/347; 423/349; 423/350; 62/606; 62/617; 438/488; 202/183; 203/71; 203/81

(58) Field of Classification Search ............ 95/45, 55, 95/56, 116, 132, 142; 96/4, 7, 108, 121, 96/134; 423/342, 347, 348, 349, 350; 62/600, 62/606, 617, 931; 438/488; 202/183; 203/71; 203/81
See application file for complete search history.

(56) References Cited

U.S. PATENT DOCUMENTS

| 4,491,604 A | 1/1985 | Lesk et al. |
| 4,654,047 A | 3/1987 | Hopkins et al. |
| 4,754,009 A | 6/1988 | Squire |
| 4,941,893 A * | 7/1990 | Hsieh et al. ............ 95/55 |
| 5,051,114 A | 9/1991 | Nemser et al. |
| 5,248,319 A | 9/1993 | Ekiner et al. |
| 5,503,657 A | 4/1996 | Bouard et al. |
| 6,312,502 B1 | 11/2001 | Li et al. |
| 6,368,568 B1 * | 4/2002 | Lord ............ 423/350 |
| 6,852,301 B2 | 2/2005 | Block et al. |
| 7,393,383 B2 | 7/2008 | Ekiner et al. |
| 2004/0052716 A1* | 3/2004 | Wakamatsu et al. ......... 423/350 |
| 2006/0086310 A1* | 4/2006 | Egeberg ............ 117/11 |
| 2009/0165646 A1 | 7/2009 | Gadre et al. |
| 2009/0165647 A1* | 7/2009 | Gadre ............ 95/55 |
| 2009/0166173 A1 | 7/2009 | Gadre |

FOREIGN PATENT DOCUMENTS

| DE | 29 18 066 | 11/1980 |
| DE | 32 07 065 | 9/1983 |
| EP | 0 192 143 | 8/1986 |
| FR | 2 852 255 | 9/2004 |
| WO | WO 2004 011372 | 2/2004 |

(Continued)

OTHER PUBLICATIONS

Hsieh, S.-T. et al., "Separation of hydrogen from silane via membranes: a step in the production of ultra-high-purity silicon," Journal of Membrane Science, 70 (1992) pp. 143-152.

(Continued)

*Primary Examiner* — Jason M Greene
(74) *Attorney, Agent, or Firm* — Patricia E. McQueeney (57) ABSTRACT

Purified $SiHCl_3$ and/or $SiCl_4$ are used as a sweep gas across a permeate side of a gas separation membrane receiving effluent gas from a polysilicon reactor. The combined sweep gas and permeate is recycled to the reactor.

12 Claims, 7 Drawing Sheets

FOREIGN PATENT DOCUMENTS

| | | |
|---|---|---|
| WO | WO 2009 087516 | 7/2009 |
| WO | WO 2009 087520 | 7/2009 |
| WO | WO 2011 002748 | 7/2009 |

OTHER PUBLICATIONS

Database WPI Week 200870, Thomson Scientific, London, GB; AN 2008-L86998 & CN 101 125 276 A (Huala Eng&Technology Co Ltd), Feb. 20, 2008.

International Search Report and Written Opinion for related PCT/US2010/055399, May 28, 2009.

International Search Report and Written Opinion for related PCT/US2010/055431, May 29, 2009.

International Search Report and Written Opinion for corresponding PCT/US2010/040344, Oct. 8, 2010.

\* cited by examiner

EFFLUENT GAS RECOVERY SYSTEM IN POLYSILICON AND SILANE PLANTS

BACKGROUND

The recent boom in the photovoltaic (PV) industry has led to an increased demand for polysilicon and silane. One of the challenges in making PV power more commonly available is reducing the cost of the PV module. Since polysilicon production accounts for a significant cost component of the PV module's cost, any improvements in the polysilicon production process will have a significant impact on the PV module cost as well.

Polysilicon is produced from either trichlorosilane (TCS) or silane ($SiH_4$) in a chemical vapor deposition reactor or fluidized bed reactor. Over ninety percent of polysilicon production is by conversion of metallurgical grade silicon (MG-Si) to TCS, which is later purified in a bell jar or fluidized bed reactor in the presence of hydrogen ($H_2$). Some polysilicon is produced by disproportionation of TCS in one or more steps to produce silane ($SiH_4$), which can be used to produce polysilicon or sold separately as a specialty gas for a variety of applications. In either production method, large quantities of silicon tetrachloride (STC) are produced. STC may either be pyrolyzed to high purity fumed silica or, more typically, converted back to TCS in a STC converter. Effluents of the chemical vapor deposition process, the fluidized bed reactor process, and the STC conversion process contain large quantities of hydrogen ($H_2$), chlorosilanes, and hydrochloric acid (HCl).

Effluent gas recovery from the polysilicon and silane production process is an important operation as it can reduce the cost of production. Some have proposed to recycle some of the hydrogen from the effluent gas using a gas separation membrane, such as disclosed by U.S. Pat. No. 4,941,893. However, such a solution comes with certain disadvantages.

When the deposition reactor is used for producing electronic grade polysilicon, it is typically operated at a pressure of about 5 psig. Therefore, the effluent leaving the reactor does not offer much driving force for separation using gas separation membranes. In order to obtain a reasonable recovery, the effluent gas should be compressed prior to feeding it to the membrane, adding a compressor cost.

The deposition reactor used to produce solar grade polysilicon is typically operated at high pressure (>75 psig) and therefore the effluent does not require compression prior to membrane separation. However, the low pressure permeate must be compressed prior to recycle to the deposition reactor pressure, adding a compressor cost.

In either process, the high concentration of chlorosilanes in the effluent may result in loss of membrane permeation properties. This would lead to frequent replacement of the membrane, adding to production cost.

Thus, it is an object to propose a method and system for effluent gas recovery for polysilicon and silane production that avoids the above described disadvantages.

SUMMARY

There is disclosed a method for recycling an effluent gas generated during polysilicon or silane production that includes the following steps. An effluent gas from a purification unit, a STC converter, and/or a polysilicon deposition reactor is directed to a condenser to produce a condensate and a non-condensate, the condensate comprising predominately $SiHCl_3$ and $SiCl_4$ and the non-condensate comprising a major amount of $H_2$, a minor amount of chlorosilanes comprising $SiHCl_3$ and $SiCl_4$, and a minor amount of HCl. The non-condensate is directed to a compressor and then to a gas separation unit that comprises at least one gas separation membrane. A sweep gas comprising $SiHCl_3$ or $SiCl_4$ is directed to a permeate side of the membrane. A recycle gas from the permeate side, wherein the recycle gas comprises $H_2$ permeated through the membrane from the non-condensate and $SiHCl_3$ or $SiCl_4$ from the sweep gas. The recycle gas is directed to a hydrochlorination reactor, the STC converter, and/or the polysilicon deposition reactor.

The disclosed method may include one or more of the following aspects:

a $H_2$ lean stream is recovered from the gas separation unit, the retentate gas comprising $SiHCl_3$, $SiCl_4$, HCl, and $H_2$;

the $H_2$ lean stream is directed to a $SiHCl_3$ production process; and purified $SiHCl_3$ or $SiCl_4$ is obtained from the $SiHCl_3$ production process, wherein the sweep gas comprises at least a portion of the obtained purified $SiHCl_3$ or $SiCl_4$.

the recycle gas is not compressed before being directed to the STC converter and/or the deposition reactor.

at least 50% of $H_2$ in the effluent gas permeates to the permeate side.

at least 90% of $H_2$ in the effluent gas permeates to the permeate side.

the $SiHCl_3$ production process comprises the steps of:

the $H_2$ lean stream is separated into light gases and heavier components, the heavier components comprising predominantly $SiHCl_3$ and $SiCl_4$, the light gases comprising a major amount of $H_2$, a minor amount of chlorosilanes comprising $SiHCl_3$, $SiCl_4$, and a minor amount of HCl;

the light gases are directed to an adsorption unit wherein the major amount of $H_2$ is stripped and the minor amount of HCl is separated from the minor amount of chlorosilanes;

the heavier components and the chlorosilanes are directed to a distillation unit comprising at least one distillation column; and the purified $SiHCl_3$ or $SiCl_4$ is produced at the distillation unit.

the $SiHCl_3$ production process further comprises the steps of:

Si and the HCl separated from the chlorosilanes are fed to chlorination reactor thereby producing impure $SiHCl_3$;

the impure $SiHCl_3$ is purified at a purification unit to produce a $SiHCl_3$ feed;

the $SiHCl_3$ feed is directed to the distillation unit.

There is also disclosed a system for recycling effluent gas generated during polysilicon or silane production that comprises: a condensation unit having an inlet, a condensate outlet, and a vapor outlet, the inlet being in communication with an effluent gas outlet of a purification unit, a STC converter, and/or a polysilicon deposition reactor; a compressor having an inlet and an outlet, the inlet being adapted and configured to fluidly communicate with the vapor outlet of the condensation unit; a gas separation unit; a reflux absorber; and a $SiHCl_3$ production unit adapted and configured to produce purified $SiHCl_3$ and $SiCl_4$. The gas separation unit comprises at least one gas separation membrane, an inlet, a permeate outlet, and a retentate outlet, wherein the inlet is adapted and configured to fluidly communicate with the outlet of the compressor and the permeate outlet is adapted and configured to communicate with a feed inlet of a hydrochlorination reactor, the STC converter, and/or the polysilicon deposition reactor. The reflux absorber comprises an inlet, a condensate outlet, and a vapor outlet, the inlet being in communication with the retentate outlet of the gas separation unit. The SiHCl$_3$ production unit comprises an inlet in fluid communication with the condensate outlet and an outlet in fluid communication with a permeate side of the membrane.

The disclosed system may include one or more of the following aspects:
the membrane has a higher permeability to H$_2$ than SiHCl$_3$, HCl, and SiCl$_4$.
there is no compressor in between the permeate outlet and the feed inlet.
the system further comprises:
an adsorption unit adapted and configured to strip H$_2$ from a SiCl$_4$, SiHCl$_3$, HCl, and H$_2$ containing vapor from the vapor outlet of the condensation unit and separate the remaining SiCl$_4$, SiHCl$_3$, and HCl into HCl and chlorosilanes comprising the remaining SiCl$_4$ and SiHCl$_3$; and
a distillation unit having inlets in fluid communication with the reflux absorber outlet and the adsorption unit and having a purified SiHCl$_3$ or SiCl$_4$ outlet in fluid communication with the inlet of the membrane.
the system further comprises:
a first SiHCl$_3$ reactor having reactant inlets in fluid communication with a source of Si and the adsorption unit;
a purification unit having an inlet and outlet, the purification unit inlet being in fluid communication with an outlet of the first SiHCl$_3$ reactor, the purification unit inlet being adapted and configured to receive impure SiHCl$_3$ from the first SiHCl$_3$ reactor, the purification unit outlet being in fluid communication with an inlet of the distillation unit.

BRIEF DESCRIPTION OF THE DRAWINGS

For a further understanding of the nature and objects of the present invention, reference should be made to the following detailed description, taken in conjunction with the accompanying drawings, in which like elements are given the same or analogous reference numbers, and wherein.

DESCRIPTION OF PREFERRED EMBODIMENTS

Figure 1:
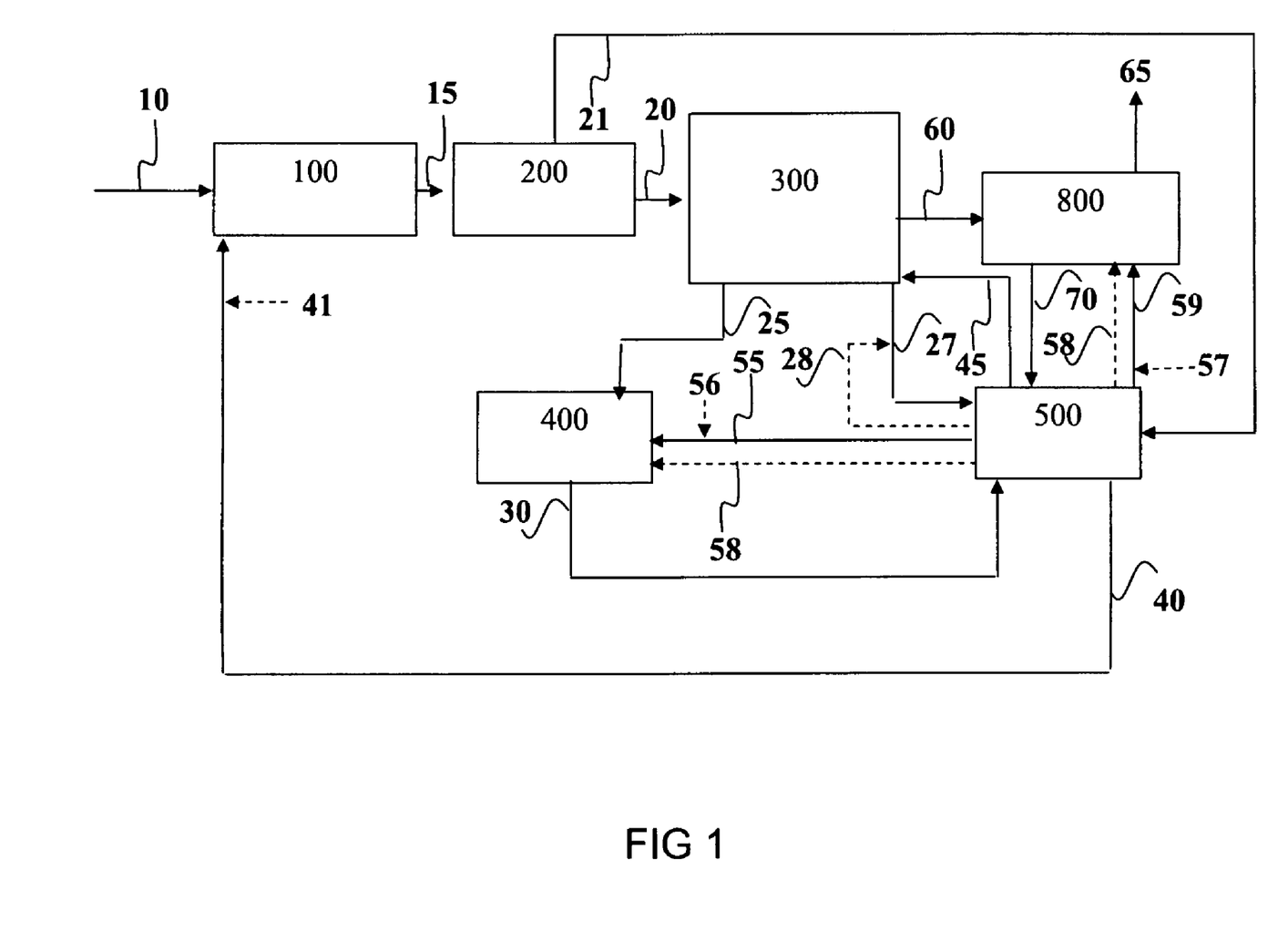
FIG. 1 is a schematic of an exemplary embodiment of the polysilicon production system and method disclosed.
Figure 2:
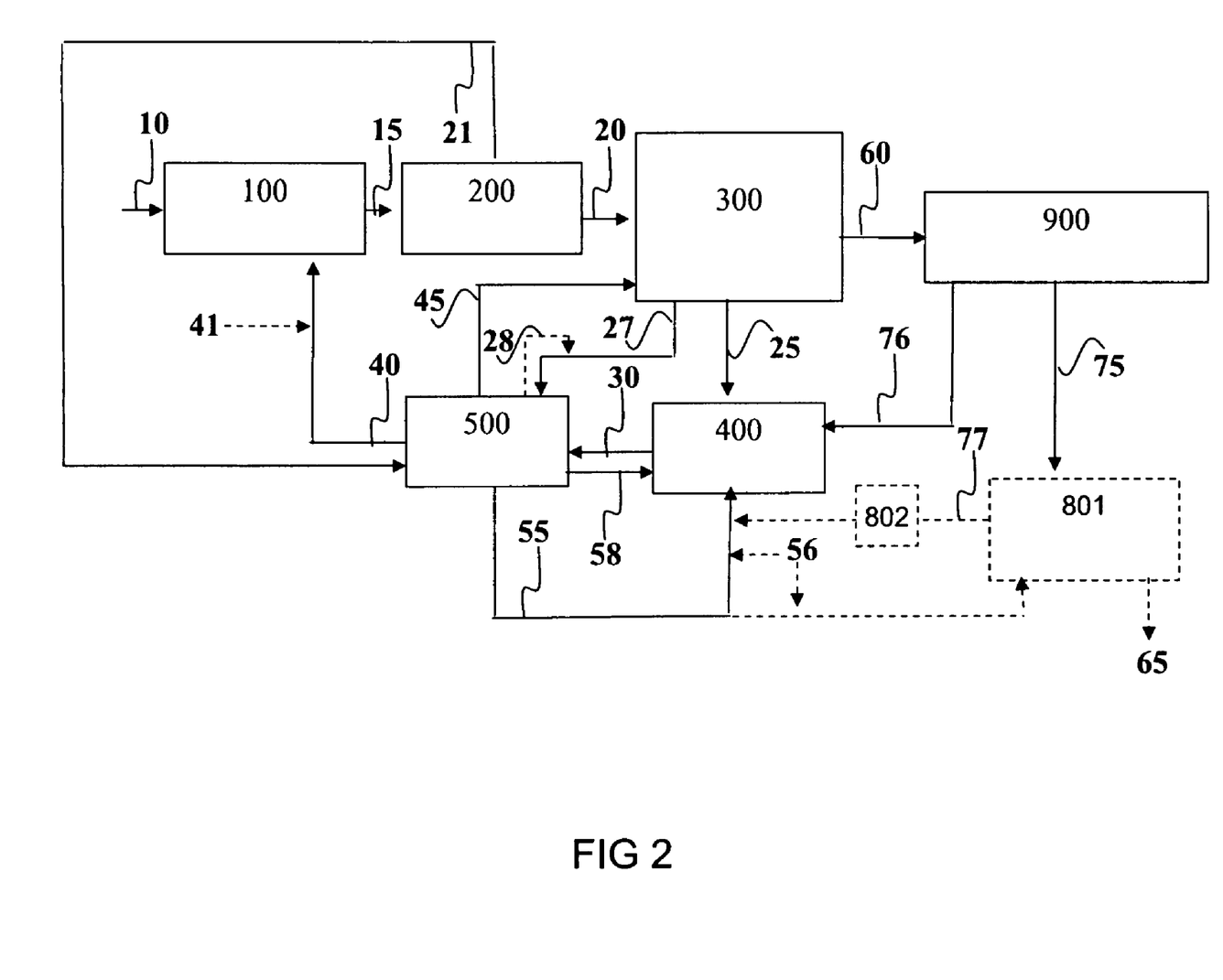
FIG. 2 is a schematic of an exemplary embodiment of the silane and polysilicon production system and method disclosed.
Figure 3:
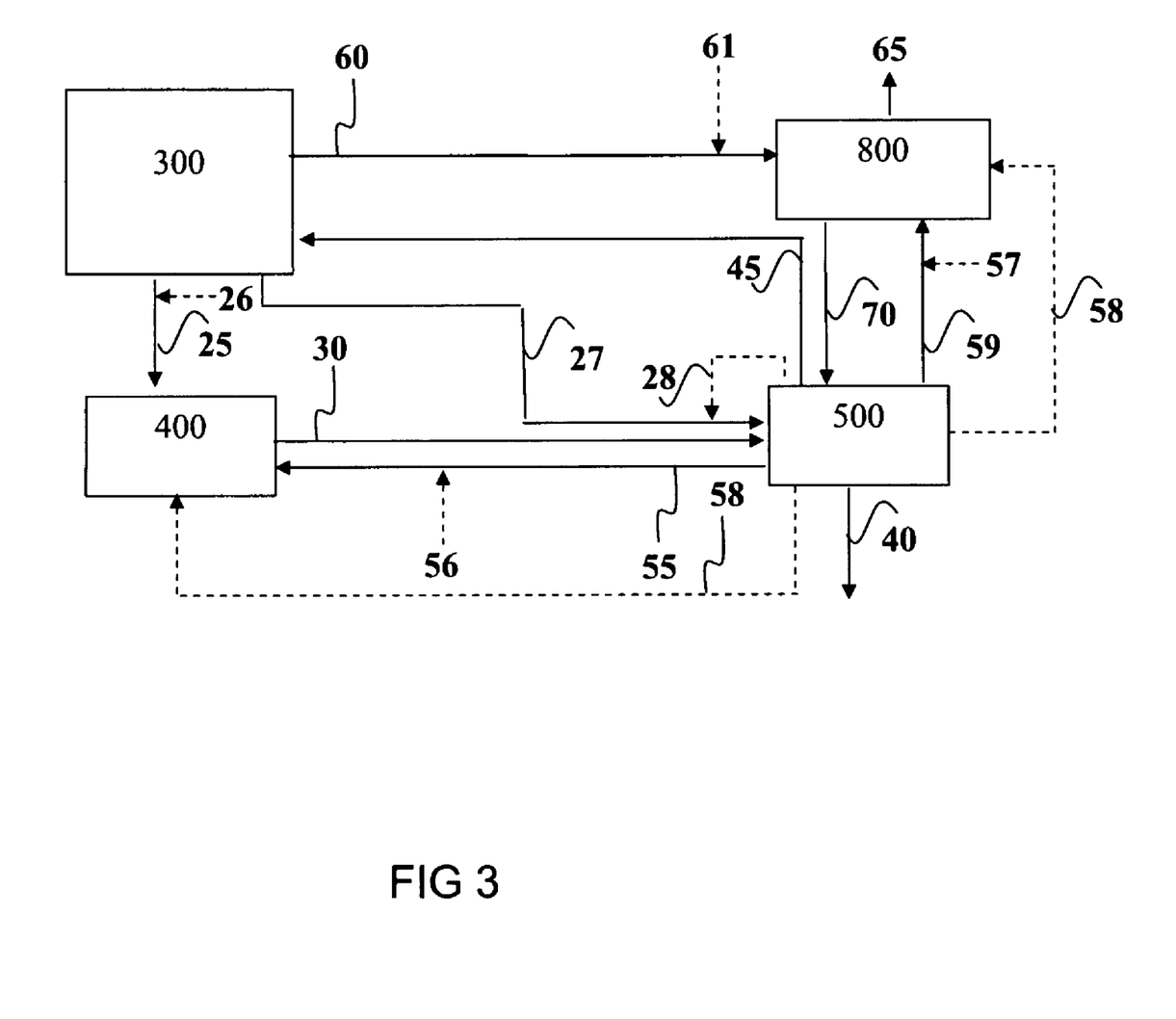
FIG. 3 is a schematic of another embodiment of the polysilicon production system and method disclosed.
Figure 4:
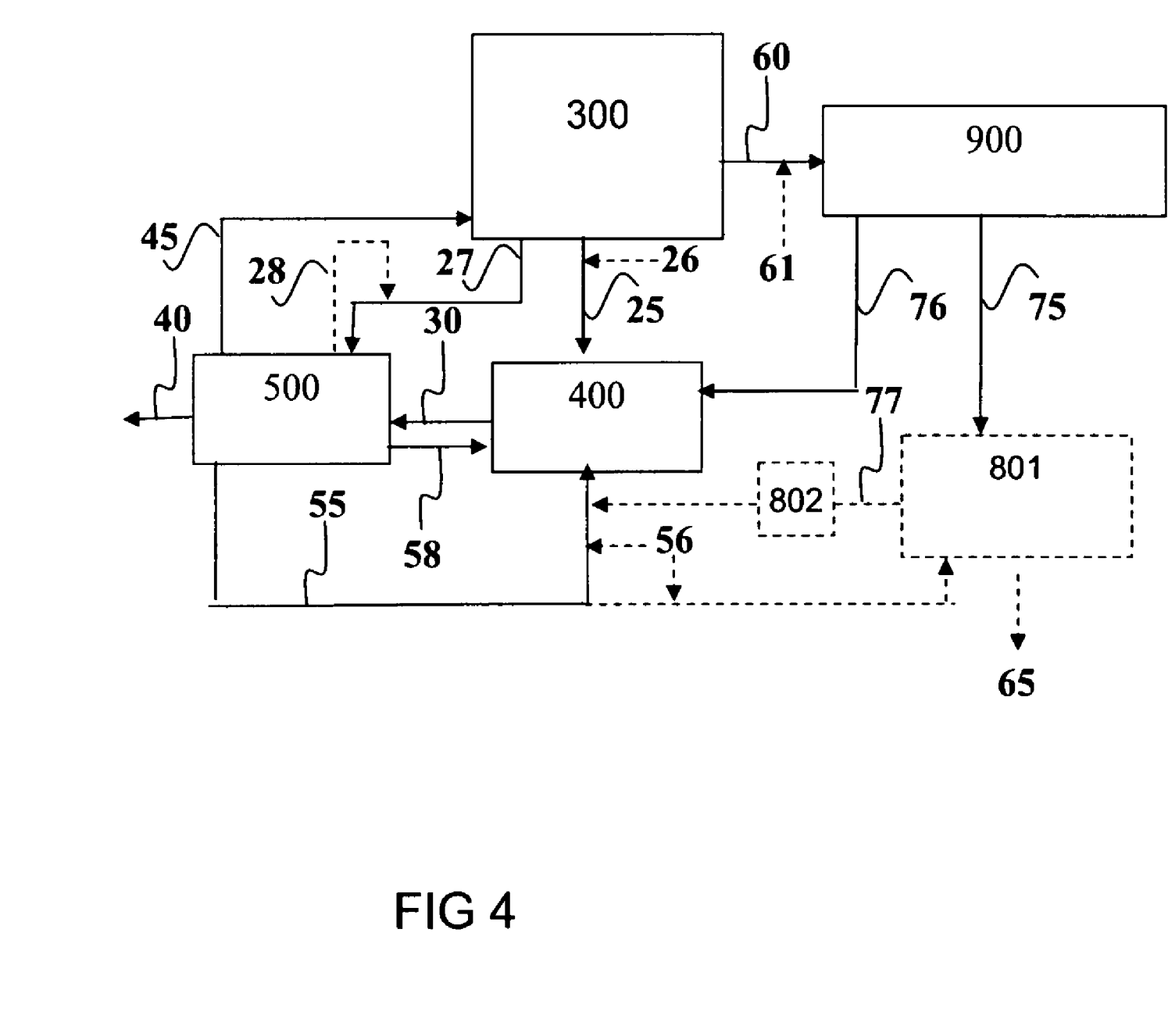
FIG. 4 is a schematic of another embodiment of the silane and polysilicon production system and method disclosed.
Figure 5:
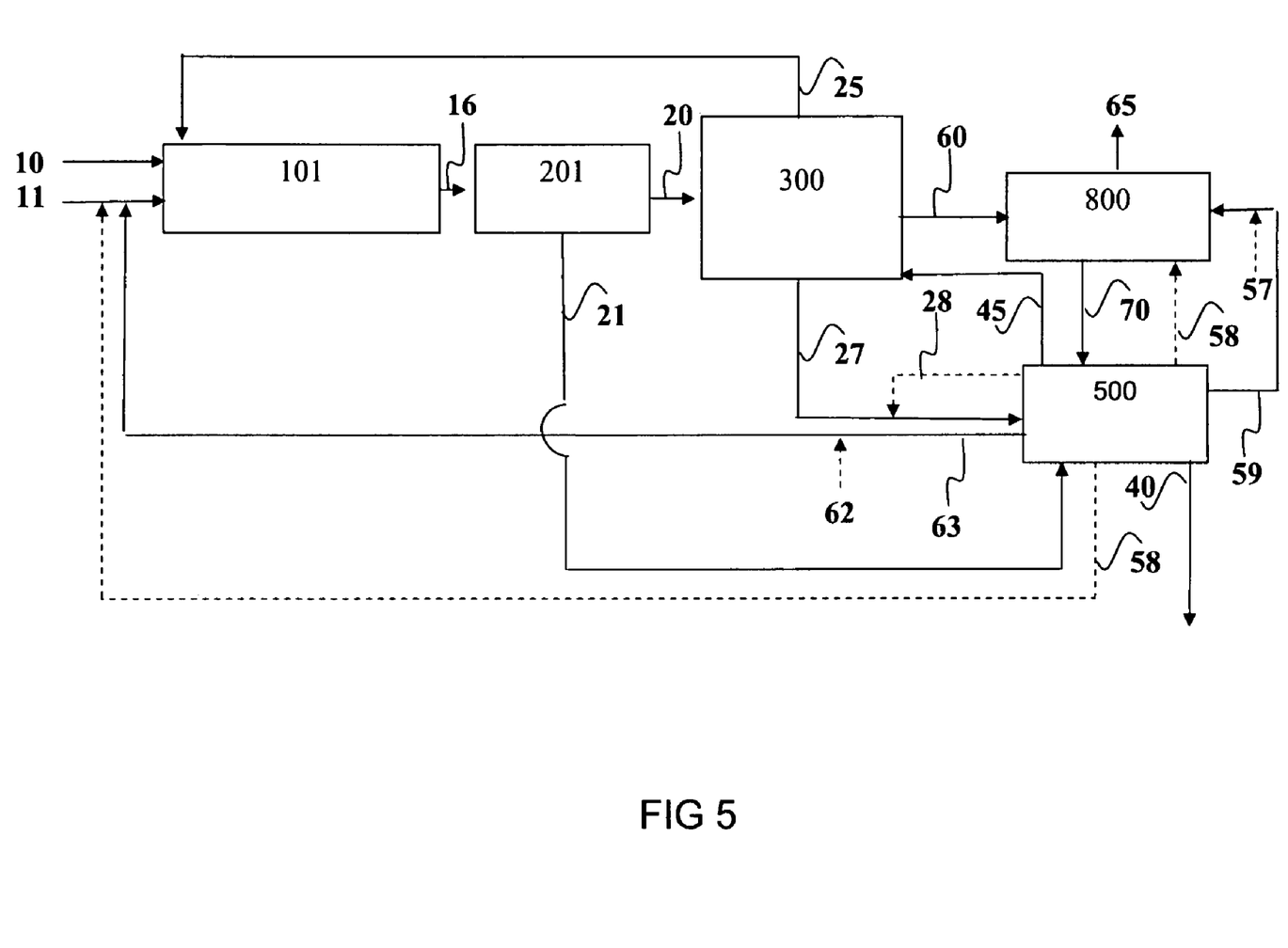
FIG. 5 is a schematic of another embodiment of the polysilicon production system and method disclosed.
Figure 6:
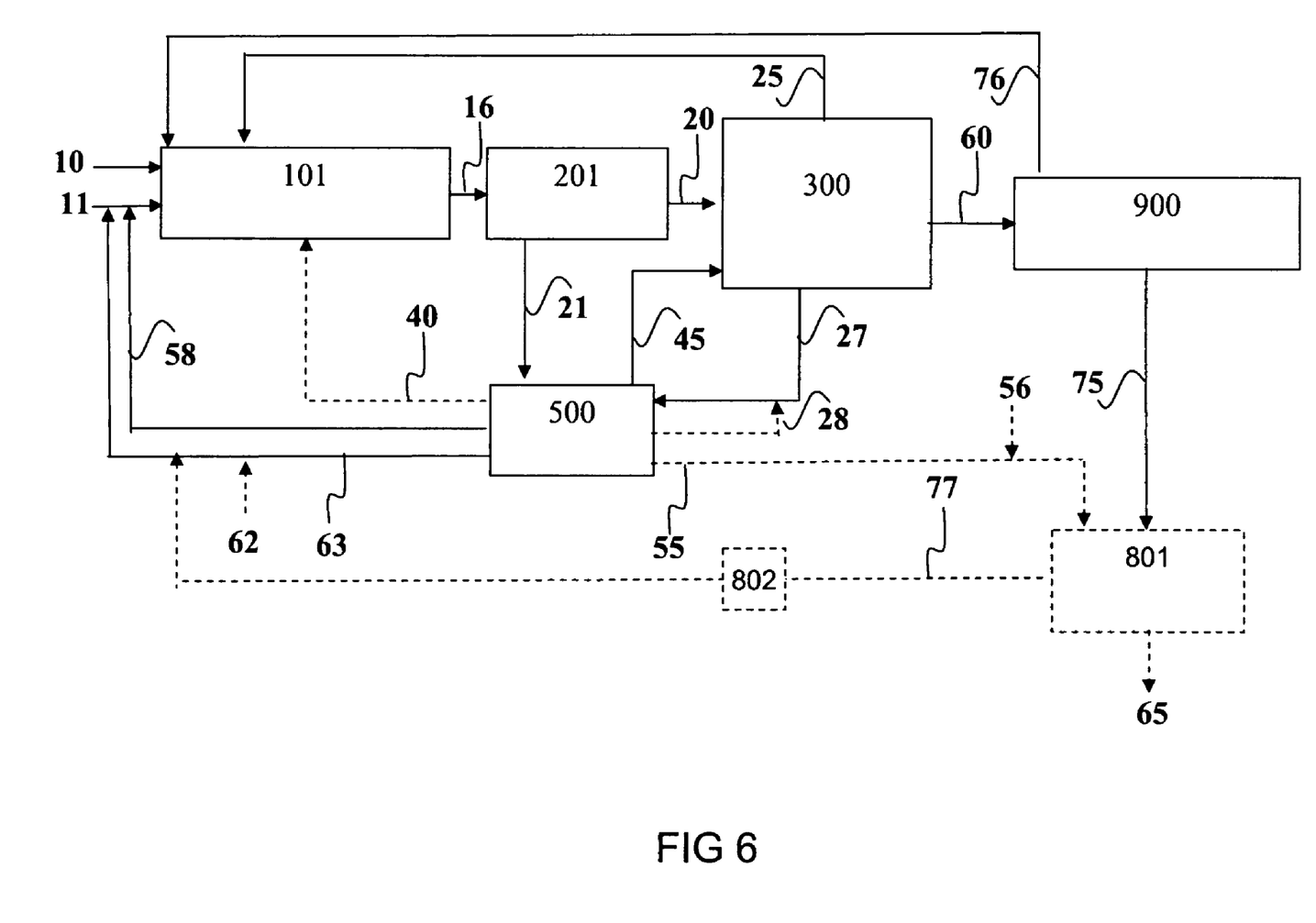
FIG. 6 is a schematic of another embodiment of the silane and polysilicon production system and method disclosed.

The effluent gas recovery system and method disclosed herein may be utilized in many different polysilicon production systems, as depicted in FIGS. 1, 3, and 5 or in silane production systems, as depicted in FIGS. 2, 4, and 6.

It will be understood that many additional changes in the details, materials, steps, and arrangement of parts, which have been herein described and illustrated in order to explain the nature of the invention, may be made by those skilled in the art within the principle and scope of the invention as expressed in the appended claims. Thus, the present invention is not intended to be limited to the specific embodiments in the examples given and/or the attached drawings.

As shown in FIG. 1, metallurgical grade silicon (MG-Si) 10 and HCl stream 40 are fed to chlorination reactor 100. The following reaction takes place at chlorination reactor 100:

Typically silicon powder ground to an average particle size of about 100-200 μm is fed continuously with hot nitrogen to the reactor 100, where the reaction takes place at about 50 psig and 300° C.

TCS product stream 15 is fed to purification unit 200 where a chlorosilane wash is utilized to condense out chlorosilane mixture from stream 15, as well as to remove any undesired solid impurities (not shown). Purification unit 200 produces a liquid chlorosilane mixture 20 and effluent gas stream 21, which is a mixture of primarily H$_2$ and HCl, with small amounts of chlorosilanes. Effluent gas stream 21 may be directed to the effluent gas recovery system 500, the details of which will be discussed with reference to FIG. 7.

Liquid chlorosilane stream 20 is fed to distillation unit 300. The distillation unit 300 may comprise one or more distillation columns, which separate the chlorosilanes into purified STC stream 25 and purified TCS stream 60.

Purified STC stream 25 is fed to STC converter 400 along with H$_2$ 55. If necessary, H$_2$ 55 may be supplemented with optional make-up H$_2$ 56. The following reaction takes place at STC converter 400:

In the STC converter 400, direct hydrogenation of STC 25 is carried out with H$_2$ 55 to produce effluent gas stream 30, which is a mixture of TCS, unreacted STC, HCl, H$_2$, and a small amount of dichlorosilane (SiCl$_2$H$_2$). The biggest advantage of this process is that no additional impurities are introduced, such as the metallic impurities often contained in MG-Silicon 10 in the other two TCS synthesis methods (hydrochlorination and chlorination). In some cases, a small amount of carbon impurities may be formed through use of carbon electrodes, which may be removed in the downstream separation processes.

Effluent gas stream 30 is fed to the effluent gas recovery system 500, the details of which will be discussed with reference to FIG. 7. In addition to effluent gas stream 30, effluent gas recovery system 500 optionally utilizes either a TCS or STC stream 27 from distillation unit 300, optionally supplemented with hydrogen 28, and produces up to three hydrogen streams (28, 55, and 59), a mixture of hydrogen and STC or TCS 58, a HCl stream 40, and a chlorosilane stream 45. The HCl stream 40 is fed to the chlorination reactor 100 and may optionally be supplemented with make-up HCl 41. The chlorosilane stream 45 is directed to the distillation unit 300 for additional processing.

The hydrogen streams (28, 55, and 59) are utilized in several different locations throughout FIG. 1. Hydrogen stream 55 is directed to the STC converter 400. Hydrogen stream 59 is directed to the deposition reactor 800. Although it is expected that both hydrogen streams 55 and 59 will be utilized simultaneously in the process disclosed, one of ordinary skill in the art will recognize that either stream may also be utilized alone. Optional hydrogen stream 28 may be used to dilute either the TCS or STC stream 27 from distillation unit 300, which will be discussed in more detail below. As with the STC converter 400, H$_2$ 59 utilized at the deposition reactor 800 may optionally be supplemented with make-up H$_2$ 57.

The mixture of hydrogen and STC or TCS 58 may only be directed to either the STC convertor 400 or to the deposition reactor 800, not to both. When directed to the STC convertor 400, the mixture of hydrogen and STC or TCS 58 contains a mixture of hydrogen and STC. As a result, and to help produce the resulting mixture, TCS or STC stream 27 from distillation unit 300 will contain STC. When directed to the deposition reactor 800, the mixture of hydrogen and STC or TCS 58 contains a mixture of hydrogen and TCS. Once again, as a result, TCS or STC stream 27 from distillation unit 300 will contain TCS.

Distillation unit 300 also produces purified TCS stream 60. As shown in FIG. 1, purified TCS stream 60 is forwarded to deposition reactor 800, along with H$_2$ stream 59, optional H$_2$ make-up stream 57, and the optional mixture of hydrogen and TCS 58, where they react according to the following reaction:

$$SiHCl_3 + H_2 \rightarrow Si + 3HCl$$

The following equilibrium reactions also play a role:

$$2SiHCl_3 \leftrightarrow Si + SiCl_4 + 2HCl \ (1050\text{-}1200°\ C.)$$

$$4SiHCl_3 \leftrightarrow 3SiCl_4 + 2H_2 + Si$$

$$SiHCl_3 + HCl \leftrightarrow SiCl_4 + H_2$$

TCS is also in equilibrium with SiCl$_2$, a key intermediate:

$$SiHCl_3 \leftrightarrow SiCl_2 + HCl$$

The reaction is equally applicable to Siemens-type bell jar reactors and fluidized bed reactors. A wall temperature of the reactor 800 is maintained at a temperature of about 575° C. and a deposition temperature is maintained at a temperature of about 1100-1125° C. One of ordinary skill in the art will recognize that the TCS 60 and H$_2$ 59 need not be fed directly to reactor 800. Rather, each of the reactants may be stored in intermediary feedstock tanks (not shown). If the reactor 800 is being used to make electronic grade polysilicon, it is typically operated at a pressure of about 5 psig. In the case of solar grade polysilicon, it is operated at a pressure of 75 psig or greater.

Reactor 800 produces effluent gas stream 70 and the polysilicon product 65, as either rods in a bell jar process or in granular form in a fluidized bed process. In the bell jar process, silicon slim rods (not shown) may be operated at approximately 1100° C. and the deposition reactor 800 may be made of carbon steel or quartz. Effluent gas stream 70 contains silicon tetrachloride (STC), HCl, H$_2$, an amount of non-reacted TCS, and small amounts of dichlorosilane and is directed to the effluent gas recovery system 500, discussed previously, and which is also discussed in further detail with reference to FIG. 7.

One of ordinary skill in the art will recognize that three separate effluent gas recovery systems 500 may be used in place of the one depicted in FIG. 1 to separately process effluent gas streams 21, 30, and 70. Alternatively, as depicted in FIG. 1, effluent gas streams 21, 30 and 70 may be combined for processing at one effluent gas recovery system 500. Alternatively, any two effluent gas streams may be processed by one system 500 with the remaining effluent gas stream processed by a separate system 500.

FIG. 2 depicts a silane production system that is similar to that of FIG. 1, with some minor modifications. Rather than direct purified TCS stream 60 to reactor 800 to produce polysilicon 65 as in FIG. 1, TCS purified stream 60 is directed to a disproportionation column 900 to produce silane 75. One of two separate disproportionation methods may be used. The following reaction occurs in the first method:

$$4SiHCl_3 \leftrightarrow SiH_4 + 3SiCl_4$$

The following two reactions occur in the second method:

$$2SiHCl_3 \leftrightarrow SiH_2Cl_2 + SiCl_4$$

$$2SiH_2Cl_2 \leftrightarrow SiH_4 + SiCl_4$$

As a hydrogen reactant is not required in the disproportionation reactions, neither hydrogen stream 59 of FIG. 1 nor the mixture of hydrogen and TCS 58 of FIG. 1 are included in the embodiment of FIG. 2. Therefore, effluent gas recovery system 500 directs a mixture of hydrogen and STC 58 to STC convertor 400 and TCS or STC stream 27 from distillation unit 300 will contain STC.

Disproportionation column 900 produces silane 75 and effluent gas stream 76. Effluent gas stream 76 contains primarily silicon tetrachloride (STC), and small amounts of other chlorosilanes such as non-reacted TCS and dichlorosilane, and is directed to the STC converter 400, discussed previously.

Silane 75 may then constitute the end product, or it may optionally be further utilized in deposition reactor 801. If silane 75 is not the desired end product, deposition reactor 801 may be used to produce the polysilicon product 65 and hydrogen stream 77, which, after processing by filter 802, may be utilized at STC converter 400. Like deposition reactor 800, deposition reactor 801 may be either a bell jar reactor or fluidized bed reactor. When deposition reactor 801 is a bell jar reactor, the feed is silane 75 alone. In the bell jar process, silicon slim rods (not shown) may be operated at approximately 800° C. and the deposition reactor 801 may be made of a water-cooled metal. When deposition reactor 801 is a fluidized bed reactor, the feed is a combination of silane 75 and hydrogen 55, which, depending upon operating conditions, may be supplemented with optional make-up hydrogen 56.

FIG. 3 depicts a polysilicon production system that is similar to that of FIG. 1, without incorporation of the trichlorosilane production process, namely MG-Si stream 10, TCS product stream 15, liquid chlorosilane mixture 20, effluent gas stream 21, HCl make-up stream 41, the chlorination reaction 100 and purification 200 steps. Rather than being direct to chlorination reaction 100 as in FIG. 1, HCl stream 40 produced by effluent gas recovery system 500 may be sold, used somewhere else in the process, or discarded for waste treatment. Optional make-up STC 26 may be added to STC stream 25 and optional make-up TCS 61 may be added to TCS stream 60 to compensate for the loss of silicon and chlorine atoms in the process. If utilized, make-up STC 26 and make-up TCS 61 may require further purification depending on the level of impurities in these streams.

FIG. 4 depicts a silane production system that is similar to that of FIG. 2, without incorporation of the trichlorosilane production process, namely MG-Si 10, TCS product stream 15, liquid chlorosilane mixture 20, effluent gas stream 21, HCl make-up stream 41, the chlorination reaction 100 and purification 200 steps. Rather than being directed to chlorination reaction 100 as in FIG. 1, HCl stream 40 produced by effluent gas recovery system 500 may be sold, used somewhere else in the process, or discarded for waste treatment. Optional make-up STC 26 may be added to STC stream 25 and optional make-up TCS 61 may be added to TCS stream 60 to compensate for the loss of silicon and chlorine atoms in the process. If utilized, make-up STC 26 and make-up TCS 61 may require further purification depending on the level of impurities in these streams.

FIG. 5 depicts another embodiment of a polysilicon production system. In this embodiment, STC stream 25, a mixture of STC and hydrogen 58, MG-Si 10, and hydrogen 11 undergo the following hydrochlorination reaction at reactor 101:

$$3SiCl_4 + 2H_2 + MG\text{-}Si \leftrightarrow 4SiHCl_3$$

TCS product stream 16 is fed to purification unit 201 where a chlorosilane wash is utilized to condense out any gaseous chlorosilane mixture from stream 16, as well as to remove any undesired solid impurities (not shown). Purification unit 201 produces a liquid chlorosilane mixture 20 and effluent gas stream 21, which is a mixture of primarily $H_2$ and HCl and small amounts of chlorosilanes. Effluent gas stream 21 may be directed to the effluent gas recovery system 500, the details of which will be discussed with reference to FIG. 7.

Liquid chlorosilane stream 20 is fed to distillation unit 300. The distillation unit 300 may comprise one or more distillation columns, which separate the chlorosilanes into purified STC stream 25 and purified TCS stream 60.

Purified TCS stream 60 is forwarded to deposition reactor 800, along with $H_2$ stream 59, optional $H_2$ make-up stream 57, and the optional mixture of hydrogen and TCS 58, where they react according to the following reaction:

$$SiHCl_3 + H_2 \rightarrow Si + 3HCl$$

The following equilibrium reactions also play a role:

$$2SiHCl_3 \leftrightarrow Si + SiCl_4 + 2HCl \ (1050\text{-}1200^\circ \text{ C.})$$

$$4SiHCl_3 \leftrightarrow 3SiCl_4 + 2H_2 + Si$$

$$SiHCl_3 + HCl \leftrightarrow SiCl_4 + H_2$$

TCS is also in equilibrium with $SiCl_2$, a key intermediate:

$$SiHCl_3 \leftrightarrow SiCl_2 + HCl$$

The reaction is equally applicable to Siemens-type bell jar reactors and fluidized bed reactors. A wall temperature of the reactor 800 is maintained at a temperature of about 575° C. and a deposition temperature is maintained at a temperature of about 1100-1125° C. One of ordinary skill in the art will recognize that the TCS 60 and $H_2$ 59 need not be fed directly to reactor 800. Rather, each of the reactants may be stored in intermediary feedstock tanks (not shown). If the reactor 800 is being used to make electronic grade polysilicon, it is typically operated at a pressure of about 5 psig. In the case of solar grade polysilicon, it is operated at a pressure of 75 psig or greater.

Reactor 800 produces effluent gas stream 70 and the polysilicon product 65, as either rods in a bell jar process or in granular form in a fluidized bed process. In the bell jar process, silicon slim rods (not shown) may be operated at approximately 1100° C. and the deposition reactor 800 may be made of carbon steel or quartz. Effluent gas stream 70 contains silicon tetrachloride (STC), HCl, $H_2$, an amount of non-reacted TCS, and small amounts of dichlorosilane and is directed to the effluent gas recovery system 500, which is also discussed in further detail with reference to FIG. 7.

In addition to effluent gas streams 21 and 70, effluent gas recovery system 500 optionally utilizes either a TCS or STC stream 27 from distillation unit 300, optionally supplemented with hydrogen 28, and produces up to three hydrogen streams (28, 59, and 63), a mixture of hydrogen and STC or TCS 58, a HCl stream 40, and a chlorosilane stream 45. The HCl stream 40 may be sold, discarded for waste treatment, or used somewhere else in the process, such as the hydrochlorination reactor 101. The chlorosilane stream 45 is directed to the distillation unit 300 for additional processing.

The hydrogen streams (28, 59, and 63) are utilized in several different locations throughout FIG. 5. Hydrogen stream 63 is directed to the hydrochlorination reactor 101 and may optionally require $H_2$ makeup stream 62 and/or a compressor (not shown) to obtain the feed pressure necessary. Hydrogen stream 59 is directed to the deposition reactor 800. Although it is expected that both hydrogen streams 59 and 63 will be utilized simultaneously in the process disclosed, one of ordinary skill in the art will recognize that either stream may also be utilized alone. Optional hydrogen stream 28 may be used to dilute either the TCS or STC stream 27 from distillation unit 300. $H_2$ 59 utilized at the deposition reactor 800 may optionally be supplemented with make-up $H_2$ 57.

If only one effluent gas recovery system 500 is utilized, the mixture of hydrogen and STC or TCS 58 may only be directed to either the hydrochlorination reactor 101 or to the deposition reactor 800, not to both. When directed to the hydrochlorination reactor 101, the mixture of hydrogen and STC or TCS 58 contains a mixture of hydrogen and STC. As a result, and to help produce the resulting mixture, TCS or STC stream 27 from distillation unit 300 will contain STC. Like hydrogen stream 63, the mixture of hydrogen and STC 58 may optionally require a compressor to obtain the feed pressure necessary at the hydrochlorination reactor 101. When directed to the deposition reactor 800, the mixture of hydrogen and STC or TCS 58 contains a mixture of hydrogen and TCS. Once again, as a result, TCS or STC stream 27 from distillation unit 300 will contain TCS.

FIG. 6 depicts a silane production system that is similar to that of FIG. 5, with some minor modifications. Rather than direct purified TCS stream 60 to reactor 800 to produce polysilicon 65 as in FIG. 5, TCS purified stream 60 is directed to a disproportionation column 900 to produce silane 75. One of two separate disproportionation methods may be used. The following reaction occurs in the first method:

$$4SiHCl_3 \leftrightarrow SiH_4 + 3SiCl_4$$

The following two reactions occur in the second method:

$$2SiHCl_3 \leftrightarrow SiH_2Cl_2 + SiCl_4$$

$$2SiH_2Cl_2 \leftrightarrow SiH_4 + SiCl_4$$

As a hydrogen reactant is not required in the disproportionation reactions, neither hydrogen stream 59 of FIG. 5 nor the mixture of hydrogen and TCS 58 of FIG. 5 are included in the embodiment of FIG. 6. Therefore, effluent gas recovery system 500 directs a mixture of hydrogen and STC 58 to hydrochlorination reactor 101 and TCS or STC stream 27 from distillation unit 300 will contain STC.

Disproportionation column 900 produces silane 75 and effluent gas stream 76. Effluent gas stream 76 contains primarily silicon tetrachloride (STC), and small amounts of other chlorosilanes such as non-reacted TCS and dichlorosilane, and is directed to the hydrochlorination reactor 101, discussed previously.

Silane 75 may then constitute the end product, or it may optionally be further utilized in deposition reactor 801. If silane 75 is not the desired end product, deposition reactor 801 may be used to produce the polysilicon product 65 and hydrogen stream 77, which, after processing by filter 802 and optional compression, may be utilized at the hydrochlorination reactor 101. Like deposition reactor 800, deposition reactor 801 may be either a bell jar reactor or fluidized bed reactor. When deposition reactor 801 is a bell jar reactor, the feed is silane 75 alone. In the bell jar process, silicon slim rods (not shown) may be operated at approximately 800° C. and the deposition reactor 801 may be made of a water-cooled metal.

When deposition reactor 801 is a fluidized bed reactor, the feed is a combination of silane 75 and hydrogen 55, which, depending upon operating conditions, may be supplemented with optional make-up hydrogen 56.

Figure 7:
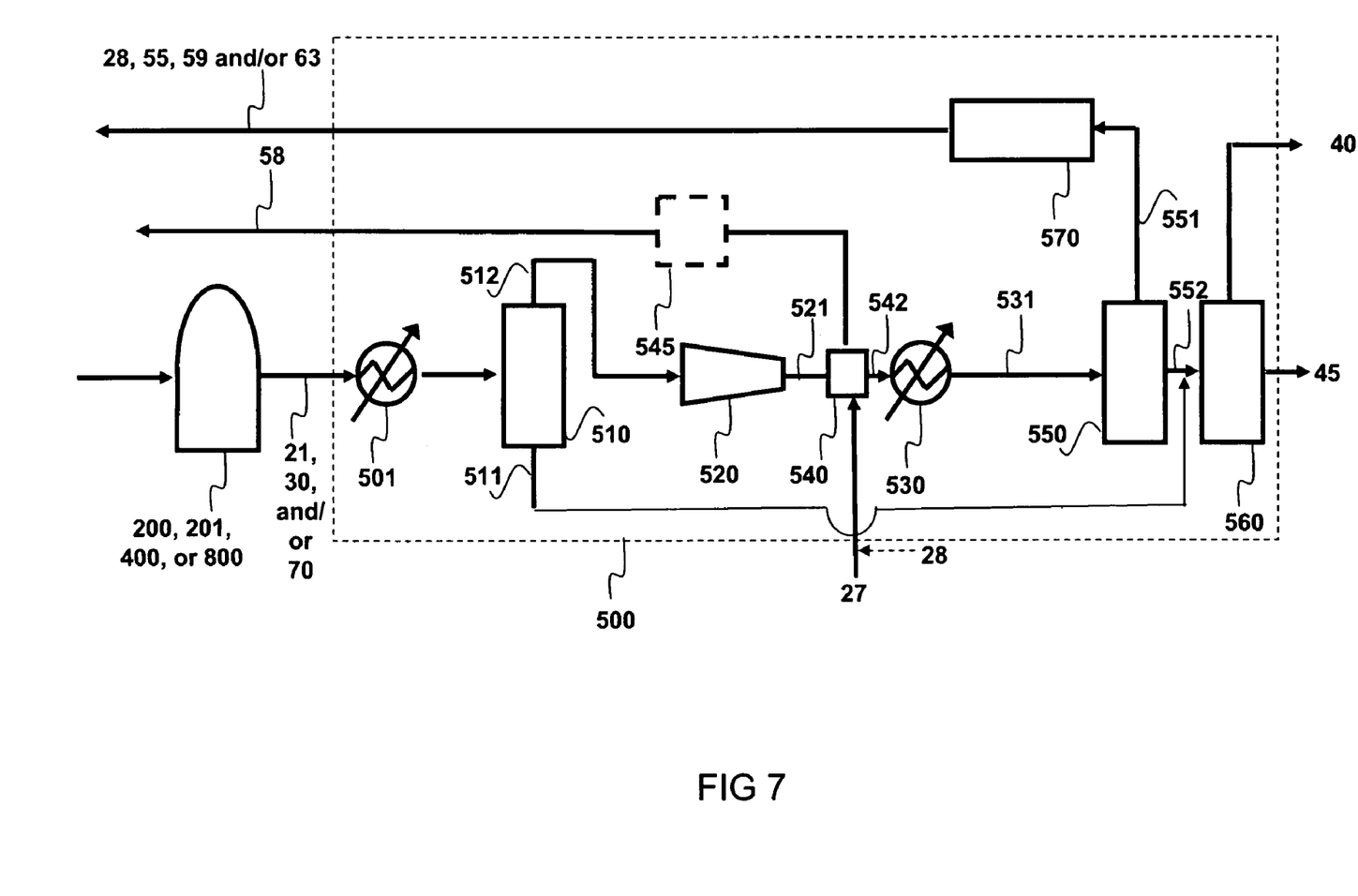
FIG. 7 is a schematic of the effluent gas recovery system and method disclosed.

FIG. 7 depicts the effluent gas recovery system 500 of FIGS. 1-6. As stated, previously, effluent gas streams 21, 30 and 70 may be combined for processing by one effluent gas recovery system 500, or multiple effluent gas recovery systems 500 may be utilized to process the effluent gas streams 21, 30 and 70 separately. Alternatively, any two effluent gas streams may be processed by one system 500 with the remaining effluent gas stream processed by a separate system 500. Furthermore, the operating parameters for the effluent gas recovery system 500 may vary depending on the intended use of the products of the system, such as the production of silane or polysilicon or whether the resulting streams or products are used in the STC converter 400, the deposition reactor 800, the chlorination reactor 100, the hydrochlorination reactor 101, etc.

Effluent gas stream 21, 30, or 70 containing $H_2$, HCl, and chlorosilanes is directed to a cooler 501, which cools the mixture to about 35° C. to −40° C., preferably 10° C. to −15° C., more preferably −12° C., and then to a condenser 510, where it is condensed at a temperature of about −40° C. and −60° C. The condensate 511 produced at condenser 510 contains mixtures of TCS, STC, and dissolved HCl and, is combined with stream 552 and processed at 560. The vapor component or non-condensate 512 contains primarily a mixture of TCS, STC, HCl, and $H_2$, and a small amount of dichlorosilane.

The non-condensate 512 is directed to a compressor 520 and compressed as compressed non-condensate 521 to a pressure of about 8 bar to about 20 bar, preferably from about 10 bar to about 14 bar. Alternatively, a compressor 520 may not be necessary if the non-condensate 512 has a pressure greater than about 8 bar.

The compressed non-condensate 521 is then directed to a gas separation unit 540 where it is separated into a $H_2$-rich stream (not shown), typically containing at least about 85% by volume $H_2$, and a $H_2$-lean stream 542 containing TCS, STC, HCl, and a minor amount of $H_2$. The gas separation unit 540 includes one or more gas separation membranes (not shown).

TCS or STC stream 27 from distillation unit 300 may be fed to the permeate "side" of the membrane where it acts as a sweep gas to lower the partial pressure of $H_2$ permeating through the membrane from the compressed non-condensate 521. One of ordinary skill in the art will recognize that the permeate "side" of a membrane does not necessarily mean one and only one side of a membrane. Rather, in the case of membranes include a plurality of hollow fibers, the permeate "side" actually is considered to be the plurality of sides of the individual hollow fibers that are opposite to the sides to which the compressed non-condensate 521 is introduced.

Optionally and in order to reduce the tendency of TCS or STC in stream 27 to condense, $H_2$ stream 28 may be added to stream 27 to lessen such tendency. The combined $H_2$-rich stream (not shown) and the TCS or STC stream 27 form the $H_2$ and TCS or STC recycle stream 58. Because the ratio of STC or TCS to $H_2$ in the combined recycle stream 58 and streams 28, 55, 59, and/or 63 may not be equivalent to the stoichiometric ratio desired for the STC reactor 400, reactor 800, or hydrochlorination reactor 101, one may optionally supplement the recycle 58 and $H_2$ 28, 55, 59, and/or 63 streams with optional make up $H_2$ 57 or by adding portions of TCS or STC from 300 (not shown). Also, if the pressure of the recycle 58 is lower than that of the STC reactor 400, reactor 800 or hydrochlorination reactor 101, an optional compressor 545 may be used to boost its pressure to the desired level.

When only one effluent gas recovery system 500 is used, the recycle stream 58 containing mixture of hydrogen and STC or TCS may only be directed to either the STC converter 400 or to the deposition reactor 800, in FIGS. 1 and 3, or to either the hydrochlorination reactor 101 or to the deposition reactor 800 in FIG. 5. When directed to the STC converter 400 or hydrochlorination reactor 101, the mixture of hydrogen and STC or TCS 58 contains a mixture of hydrogen and STC. As a result, and to help produce the resulting mixture, TCS or STC stream 27 from distillation unit 300 will contain STC. Like hydrogen stream 63, the mixture of hydrogen and STC 58 may optionally require a compressor (not shown) to obtain the feed pressure necessary at the hydrochlorination reactor 101. When directed to the deposition reactor 800, the mixture of hydrogen and STC or TCS 58 contains a mixture of hydrogen and TCS. Once again, as a result, TCS or STC stream 27 from distillation unit 300 will contain TCS.

The $H_2$-lean stream 542 from gas separation unit 540 is directed to a cooler 530, where it is cooled to 35° C. to −80° C., preferably 10° C. to −60° C., more preferably −40° C.

The cooled, $H_2$-lean stream 531 is directed to a refluxed absorber 550, where light gases 551, such as hydrogen and a small amount of HCl, are separated from heavier components 552, such as chlorosilanes and dissolved HCl. Stream 552 contains mixtures of TCS, STC, and dissolved HCl while stream 551 primarily contains $H_2$, with a small amount of TCS, STC, HCl. The heavier components 552 are directed to distillation unit 560, which may comprise one or more distillation columns, and which separates the chlorosilanes 45 from the dissolved HCl 40.

The light gases 551 are directed to an adsorption unit 570 which may be a thermal swing adsorption (TSA) unit or a pressure swing adsorption (PSA) unit operated to separate $H_2$, HCl, and chlorosilanes (TCS and STC). The $H_2$ portion freely passes through the adsorbent as hydrogen streams 28, 55, 59 and/or 63. Depending on the system utilized, stream 63 may be directed towards a compressor (not shown) for eventual feeding to hydrochlorination reactor 101 while stream 55 may be directed towards STC converter 400, stream 59 may be directed toward deposition reactor 800, and stream 28 may be directed to stream 27 all without compression. The recovered HCl and TCS/STC portions (not shown) are either forwarded for waste treatment or recovered for reuse.

Practice of the invention yields several benefits.

By using the purified TCS or STC stream 27 (and optionally $H_2$ stream 28) to sweep the permeate side of the membrane, the partial pressure of $H_2$ on the permeate side is decreased thus increasing the partial pressure driving force for this separation. Almost all of the $H_2$, preferably at least 85%, can be transferred from the compressed non-condensate side to permeate side by using a membrane with a high enough selectivity for $H_2$ over chlorosilanes. However, one of ordinary skill in the art will recognize that the invention may be performed such that as little as 50% of the $H_2$ can be transferred from the compressed non-condensate side to the permeate side. Additionally, depending upon the required pressure of the feed at hydrochlorination reactor 101, STC converter 400, and/or deposition reactor 800, the resultant recycle stream 58 may be at a pressure sufficiently high enough that the recycle 58 need not be compressed by optional compressor 545 before being fed to hydrochlorination reactor 101, STC converter 400, and/or deposition reactor 800. Alternatively, the degree of compression by optional compressor 545 of the recycle 58 may be reduced in comparison to conventional solutions not utilizing a TCS or STC stream 27 sweep gas.

The phrase "recycle gas [or "stream"] is directed to [or "fed to"] the hydrochlorination reactor 101, STC converter 400, and/or deposition reactor 800" is not limited to methods whereby the recycle gas 58 goes directly to the hydrochlorination reactor 101, STC converter 400, and/or deposition reactor 800. Also, practice of the disclosed method is not limited to those whereby the recycle gas 58 goes directly to the hydrochlorination reactor 101, STC converter 400, and/or deposition reactor 800. Rather, it is within the scope of the disclosed method and claimed subject matter to include one or more intermediate vessels (not shown) for containing the recycle gas 58 or buffer vessels (not shown) for buffering a flow of recycle gas 58 to the hydrochlorination reactor 101, STC converter 400, and/or deposition reactor 800. One such vessel is the feedstock tank (not shown).

Since only the retentate flow 542 from the gas separation unit 540 is fed to the purification system cooler 530, the reduced mass flow rate enables the use of smaller volume equipment and lowered energy requirements. Also, since the $H_2$ permeation rate is much faster than any other species present in the effluent gas streams 21, 30, and/or 70, the permeate stream has a negligible amount of undesirable impurities.

Suitable gas separation membranes include those chemically resistant to TCS, STC, $H_2$, and HCl and which exhibit an enhanced permeance of $H_2$ in comparison to the TCS, STC, and HCl. Such membranes can be configured in a variety of ways: sheet, tube, hollow fiber, etc.

Preferably, the gas separation membrane of gas separation unit 11 is a spiral flat sheet membrane or hollow fiber membrane made of a polymeric material such as a polysulfone, a polyether sulfone, a polyimide, a polyaramide, a polyamide-imide, and blends thereof.

One preferred type of hollow fiber membrane includes those disclosed by U.S. Pat. No. 7,393,383, the contents of which are incorporated herein in their entirety. Those hollow polymeric fibers include polyimides, polyamides, polyamide-imides, and blends thereof. They include an outer selective layer.

The polyimide contains the repeating units as shown in the following formula (I):

(I)

in which $R_1$ of formula (I) is a moiety having a composition selected from the group consisting of formula (A), formula (B), formula (C), and mixtures thereof, and (A)

(B)

(C)

in which $R_4$ of formula (I) is a moiety having a composition selected from the group consisting of formula (Q), formula (S), formula (T) and mixtures thereof, (Q)

(S)

(T)

in which Z of formula (T) is a moiety selected from the group consisting of formula (L), formula (M), formula (N) and mixtures thereof.

(L)

(M)

(N)

In one preferred embodiment, the polyimide component of the blend that forms the selective layer of the membrane has repeating units as shown in the following formula (Ia):

(Ia)

In this embodiment, moiety $R_1$ of formula (Ia) is of formula (A) in 0-100% of the repeating units, of formula (B) in 0-100% of the repeating units, and of formula (C) in a complementary amount totaling 100% of the repeating units.

A polymer of this structure is available from HP Polymer GmbH under the trade name P84. P84 is believed to have repeating units according to formula (Ia) in which $R_1$ is formula (A) in about 16% of the repeating units, formula (B) in about 64% of the repeating units and formula (C) in about 20% of the repeating units. P84 is believed to be derived from the condensation reaction of benzophenone tetracarboxylic dianhydride (BTDA, 100 mole %), with a mixture of 2,4-toluene diisocyanate (2,4-TDI, 64 mole %), 2,6-toluene diisocyanate (2,6-TDI, 16 mole %) and 4,4'-methylene-bis (phenylisocyanate) (MDI, 20 mole %).

The polyimide (that is preferably formed in a known way to provide an outer selective layer) comprises repeating units of formula (Ib):

(Ib)

In one preferred embodiment, the polyimide is of formula (Ib) and $R_1$ of formula (Ib) is a composition of formula (A) in about 0-100% of the repeating units, and of formula (B) in a complementary amount totaling 100% of the repeating units.

In yet another embodiment, the polyimide is a copolymer comprising repeating units of both formula (Ia) and (Ib) in which units of formula (Ib) constitute about 1-99% of the total repeating units of formulas (Ia) and (Ib). A polymer of this structure is available from HP Polymer GmbH under the trade name P84HT. P84HT is believed to have repeating units according to formulas (Ia) and (Ib) in which the moiety $R_1$ is a composition of formula (A) in about 20% of the repeating units and of formula (B) in about 80% of the repeating units, and, in which repeating units of formula (Ib) constitute about 40% of the total of repeating units of formulas (Ia) and (Ib). P84HT is believed to be derived from the condensation reaction of benzophenone tetracarboxylic dianhydride (BTDA, 60 mole %) and pyromellitic dianhydride (PMDA, 40 mole %) with 2,4-toluene diisocyanate (2,4-TDI, 80 mole %) and 2,6-toluene diisocyanate (2,6-TDI, 20 mole %). The polyamide polymer of the blend that forms the selective layer of the membrane comprises the repeating units of the following formula (II):

(II)

in which $R_a$ is a moiety having a composition selected from the group consisting of formulas:

(a)

(b)

(c)

(d)

(e)

(f)

(g)

wherein Z' of formula (g) is a moiety represented by the formula:

(h)

(j)

(k)

and mixtures thereof, and in which X, $X_1$, $X_2$, and $X_3$ of formulas a, b, d, e, f, g, h, j, and, l independently are hydrogen or an alkyl group having 1 to 6 carbon atoms, and Z" of formula (I) is selected from the group consisting of:

in which X of formula (p) is a moiety as described above.

$R_2$ of formula (II) is a moiety having a composition selected from the group consisting of formulas:

and mixtures thereof.

The polyamide-imide polymers of the blend that forms the selective layer of the membrane comprises the repeating units of formula (III); and/or a combination of the repeating units of formulas (I) and (II), (I) and (III), (II) and (III), and/or (I), (II), and (III).

in which $R_a$, $R_2$, and $R_4$ are the same as described above, and $R_3$ is

Membranes made from a blend of a polyimide or polyimides with a polyamide or polyamides, the ratio of polyimide to polyamide should preferably be at least 1:1, and more preferably, at least 2:1.

In the case of membranes made from a blend of a polyimide or polyimides with a polyamide-imide or polyamide-imides, the ratio of polyimide to polyamide-imide should preferably, be at least 1:1, and more preferably at least 2:1.

In the case of membranes made from a blend of a polyimide or polyimides with a polyamide or polyamides, and a polyamide-imide or polyamide-imides, the blend should preferably contain between 20-80% polyimide.

Surprising, the blends of this invention are homogeneous over a broad range of compositions. The miscibility of the blends of this invention may be confirmed by the presence of single compositional dependent glass transition temperature lying between those of the constituent blend components. The glass transition temperature can be measured by Differential Scanning Calorimetry or Dynamic Mechanical Analysis.

The polyimides described above are made by methods well known in the art. The polyimides can, for example, be conveniently made by polycondensation of an appropriate diisocyanate with approximately an equimolar amount of an appropriate dianhydride. Alternatively, the polyimides can be, for example, made by polycondensation of equimolar amounts of a dianhydride and a diamine to form a polyamic acid followed by chemical or thermal dehydration to form the polyimide. The diisocyanates, diamines, and dianhydrides useful for making the polyimides of interest are usually available commercially. The polyimides are typically prepared by the latter diamine process because the diamines are more readily available than the corresponding diisocyanates.

The polyamides described above can be made conveniently by polycondensation of an appropriate diamine or diamines with approximately an equimolar amount of an appropriate diacid chloride or mixtures of diacid chlorides by methods well known in the art.

The polyamide-imide polymers described above can be made conveniently by polycondensation of an appropriate diamine with approximately an equimolar amount of an appropriate triacid anhydride/chloride (i.e., repeating units of formula (III)).

In the case of a mixture of polyamide/polyamide-imides, the polyamide-imides described herein can be made conveniently by:

1) polycondensation of an appropriate diamine or diamines with an equimolar amount of a mixture of dianhydride and diacid chloride mixture (i.e., repeating units of formulas (I) and (II));
2) polycondensation of an appropriate diamine or diamines with an equimolar amount of a mixture of dianhydride and triacid anhydride chloride (i.e., repeating units of formulas (I) and (III));
3) polycondensation of an appropriate diamine or diamines with an equimolar amount of a mixture of diacid-chloride and triacid anhydride/chloride (i.e., repeating units of formulas II and III); or
4) polycondensation of an appropriate diamine or diamines with an equimolar amount of a mixture of dianhydride, diacid chloride, and triacid anhydride/chloride (i.e., repeating units of formulas I, II, and III).

The polyimides, polyamides, and polyamide-imides should be of suitable molecular weight to be film forming and pliable so as to be capable of being formed into continuous films or membranes. The polymers of this invention preferably have a weight average molecular weight within the range of about 20,000, to about 400,000, and more preferably, about 50,000 to about 300,000.

Another type of polymeric material particularly useful in the membrane includes an amorphous polymer of perfluoro-2,2-dimethyl-1,3-dioxole, as disclosed in U.S. Pat. No. 5,051,114, the contents of which are incorporated by reference herein in their entirety. It may be a homopolymer of perfluoro-2,2-dimethyl-1,3-dioxole. It may instead be a copolymer of perfluoro-2,2-dimethyl-1,3-dioxole, including copolymers having a complementary amount of at least one monomer selected from the group consisting of tetrafluoroethylene, perfluoromethyl vinyl ether, vinylidene fluoride and chlorotrifluoroethylene. Preferably, the polymer is a dipolymer of perfluoro-2,2-dimethyl-1,3-dioxole and a complementary amount of tetrafluoroethylene, especially such a polymer containing 65-99 mole % of perfluoro-2,2-dimethyl-1,3-dioxole. The amorphous polymer preferably has a glass transition temperature of at least 140.degree. C., and more preferably at least 180.degree. C. Examples of dipolymers are described in further detail in U.S. Pat. No. 4,754,009, the contents of which are incorporated by reference herein in their entirety.

Another type of polymeric material particularly useful in the membrane includes a polymer available under the trade name MATRIMID 5218, a polymer available under the trade name ULTEM 1000, and blends thereof as disclosed in U.S. Pat. No. 5,248,319. MATRIMID 5218 is the polymeric condensation product of 3,3',4,4'-benzophenone tetracarboxylic dianhydride and 5(6)-amino-1-(4'-aminophenyl)-1,3,3'-trimethylindane, commercially available from Ciba Specialty Chemicals Corp. Ultem 1000 may be obtained from a wide variety of commercial sources, including Polymer Plastics Corp. located in Reno, Nev. and Modern Plastics located in Bridgeport, Conn. Ultem 1000 has the formula shown below.

The membranes of the invention typically have continuous channels for fluid flow extending between the exterior and interior surfaces. These pores have an average cross-sectional diameter less than about 20,000 Angstroms, preferably less than about 1,000 or 5,000 Angstroms. The hollow fibers may have outside diameters of about 20 to 1,000 microns, generally about 50 to 1,000 microns, and have walls of at least about 5 microns in thickness, generally about 50 to about 1,000 microns thick. The wall thickness in some hollow fibers may be up to about 200 or 300 microns. The coating may have a thickness ranging from about 0.01 to about 10 microns and preferably has a thickness of about 0.05 to about 2 microns.

In the case of hollow fiber membranes, in order to provide desirable fluxes through the hollow fibers, particularly using those hollow fibers having walls at least about 50 microns in thickness, the hollow fibers may have a substantial void volume. Voids are regions within the walls of the hollow fibers which are vacant of the material of the hollow fibers. Thus, when voids are present, the density of the hollow fiber is less than the density of the bulk material of the hollow fiber. Often, when voids are desired, the void volume of the hollow fibers is up to about 90, generally about 10 to about 80, and sometimes about 20 or about 30 to about 70, percent based on the superficial volume, i.e., the volume contained within the gross dimensions, of the hollow fiber or flat sheet.

The density of the hollow fiber can be essentially the same throughout its thickness, i.e., isotropic, but the hollow fiber is preferably characterized by having at least one relatively dense region within its thickness in barrier relationship to fluid flow through the wall of the hollow fiber, i.e., the hollow fiber is anisotropic.

One of ordinary skill in the art will recognize that well known system parameters such as the number of fibers can be adjusted such that recycle 94 leaving the permeate side of the membrane has a composition suitable for the deposition reactor.

Preferred processes and apparatus for practicing the present invention have been described. It will be understood and readily apparent to the skilled artisan that many changes and modifications may be made to the above-described embodiments without departing from the spirit and the scope of the present invention. The foregoing is illustrative only and that other embodiments of the integrated processes and apparatus may be employed without departing from the true scope of the invention defined in the following claims.

What is claimed is:

1. A method for recycling an effluent gas generated during polysilicon or silane production, comprising the steps of:

directing the effluent gas comprising at least $SiHCl_3$, $SiCl_4$, HCl, and $H_2$ from a purification unit, a STC converter, and/or a polysilicon deposition reactor to a condenser to produce a condensate and a non-condensate, the condensate comprising predominantly $SiHCl_3$ and $SiCl_4$, the non-condensate comprising a major amount of $H_2$, a minor amount of chlorosilanes comprising $SiHCl_3$, $SiCl_4$, and a minor amount of HCl;

directing the non-condensate to a compressor and then to a gas separation unit comprising at least one gas separation membrane;

directing a sweep gas comprising $SiHCl_3$ or $SiCl_4$ to a permeate side of the membrane;

recovering a recycle gas from the permeate side, the recycle gas comprising $H_2$ permeated through the membrane from the non-condensate and $SiHCl_3$ or $SiCl_4$ from the sweep gas; and directing the recycle gas to a hydrochlorination reactor, the STC converter, and/or the deposition reactor.

2. The method of claim 1, further comprising the steps of:
recovering a $H_2$ lean stream from the gas separation unit, the $H_2$ lean stream comprising $SiHCl_3$, $SiCl_4$, HCl, and $H_2$;

directing the $H_2$ lean stream to a $SiHCl_3$ production process; and obtaining purified $SiHCl_3$ or $SiCl_4$ from the $SiHCl_3$ production process, wherein the sweep gas comprises at least a portion of the obtained purified $SiHCl_3$ or $SiCl_4$.

3. The method of claim 1, wherein the recycle gas is not compressed before being directed to the STC converter and/or the deposition reactor.

4. The method of claim 1, wherein at least 50% of $H_2$ in the effluent gas permeates to the permeate side.

5. The method of claim 1, wherein at least 90% of $H_2$ in the effluent gas permeates to the permeate side.

6. The method of claim 2, wherein said $SiHCl_3$ production process comprises the steps of:

separating the $H_2$ lean stream into light gases and heavier components, the heavier components comprising predominantly $SiHCl_3$ and $SiCl_4$, the light gases comprising a major amount of $H_2$, a minor amount of chlorosilanes comprising $SiHCl_3$, $SiCl_4$, and a minor amount of HCl;

directing the light gases to an adsorption unit wherein the major amount of $H_2$ is stripped and the minor amount of HCl is separated from the minor amount of chlorosilanes;

directing the heavier components and the chlorosilanes to a distillation unit comprising at least one distillation column; and producing the purified $SiHCl_3$ at the distillation unit.

7. The method of claim 6, wherein said $SiHCl_3$ production process further comprises the steps of:

feeding Si and the HCl separated from the chlorosilanes to a chlorination reactor thereby producing impure $SiHCl_3$;

purifying the impure $SiHCl_3$ at a purification unit to produce a chlorosilane mixture feed;

directing the chlorosilane mixture feed to the distillation unit.

8. A system for recycling effluent gas generated during polysilicon or silane production, comprising:

a condensation unit having an inlet, a condensate outlet, and a vapor outlet, the inlet being in communication with an effluent gas outlet of a purification unit, a STC converter, and/or a polysilicon deposition reactor;

a compressor having an inlet and an outlet, the inlet being adapted and configured to fluidly communicate with the vapor outlet of the condensation unit;

a gas separation unit comprising at least one gas separation membrane, an inlet, a permeate outlet, and a retentate outlet, the inlet being adapted and configured to fluidly communicate with the outlet of the compressor, the permeate outlet being adapted and configured to fluidly communicate with a feed inlet of a hydrochlorination reactor, the STC converter, and/or the deposition reactor;

a reflux absorber having an inlet, a condensate outlet, and a vapor outlet, the inlet being in communication with the retentate outlet; and a $SiHCl_3$ production unit adapted and configured to produce purified $SiHCl_3$ comprising an inlet in fluid communication with the condensate outlet of the reflux absorber and an outlet in fluid communication with a permeate side of the membrane.

9. The system of claim 8, wherein the membrane has a higher permeability to $H_2$ than $SiHCl_3$, HCl, and $SiCl_4$.

10. The system of claim 8, wherein there is no compressor in between the permeate outlet and the feed inlet.

11. The system of claim 8, further comprising:
an adsorption unit adapted and configured to strip $H_2$ from a $SiCl_4$, $SiHCl_3$, HCl, and $H_2$ containing vapor from the vapor outlet of the reflux absorber and separate the remaining $SiCl_4$, $SiHCl_3$, and HCl into HCl and chlorosilanes comprising the remaining $SiCl_4$ and $SiHCl_3$; and a distillation unit having inlets in fluid communication with the reflux absorber outlet and the adsorption unit and having a purified $SiHCl_3$ or $SiCl_4$ outlet in fluid communication with the inlet of the membrane.

12. The system of claim 11, further comprising:
a first $SiHCl_3$ reactor having reactant inlets in fluid communication with a source of Si and the adsorption unit; and a purification unit having an inlet and outlet, the purification unit inlet being in fluid communication with an outlet of the first $SiHCl_3$ reactor, the purification unit inlet being adapted and configured to receive impure $SiHCl_3$ from the first $SiHCl_3$ reactor, the purification unit outlet being in fluid communication with an inlet of the distillation unit.

* * * * *